March 6, 1962 — J. J. POWLAS — 3,023,852
BRAKE

Filed Jan. 4, 1960 — 2 Sheets-Sheet 1

INVENTOR.
JAMES J. POWLAS
BY John A. Young
ATTORNEY

March 6, 1962   J. J. POWLAS   3,023,852
BRAKE
Filed Jan. 4, 1960   2 Sheets-Sheet 2

INVENTOR.
JAMES J. POWLAS
BY John A. Young
ATTORNEY

United States Patent Office 3,023,852
Patented Mar. 6, 1962

3,023,852
BRAKE
James Jerome Powlas, South Bend, Ind., assignor to The Bendix Corporation, a corporation of Delaware
Filed Jan. 4, 1960, Ser. No. 155
7 Claims. (Cl. 188—78)

This invention relates to an internally expanding shoe type brake, and more particularly to a "controlled servo brake" meaning that the anchoring force of one of the shoes is utilized as an applying effort on the other of the brake shoes but is reduced in magnitude before it is communicated as applying effort on the other shoe.

One of the most effective shoe type brakes known is the servo type brake in which a part of the braking force of one shoe is transmitted as applying effort on a second shoe. The disadvantages of such a brake, however, lie in the unequal pattern of wear of the respective shoes; for example, the secondary shoe which is the servo applied shoe, wears at a much faster rate than the primary or servo applying shoe. Also, the controllability of the brake is somewhat reduced and it tends to fade with increased brake temperature at a much faster rate than brakes which are not of the servo type.

It is one of the objects of the present invention to provide a controlled servo brake in which a part only of the anchoring force of the one brake shoe is transmitted to the other brake shoe as an applying force and in such amount that it is substantially the same as the input applying force on the primary shoe. As a result, the two shoes can be expected to wear at approximately the same rate.

Another advantage of the controlled servo brake is that engagement pressure around the circumference of the drum is more nearly equalized, thereby balancing the drum and wheel bearing loads.

Many of these above advantages have been attempted to be secured by means of providing a separate actuator for each of the brake shoes. The present invention is a distinct advantage over such an arrangement in that one of the fluid motors for each shoe can be eliminated to effect a substantial cost saving. Also the linkage which connects the two shoes makes it much easier to mount the brake than in the case where two fluid motors are used. As a result the brake structure is better adapted to be fitted into cramped vehicle wheel spacings. Also, the pedal travel requirements are substantially reduced because movement of the applying shoe is multiplied through a linkage to meet the applying requirements of the other shoe. The multiplied movement represents a saving in fluid displacement for the single fluid motor which applied both shoes. In the event that an air actuator is used instead of hydraulic fluid, then usage of only one air actuator eliminates the usual losses of one air chamber.

While numerous attempts have been made in the past to provide a controlled servo action between the brake shoes, the present invention is a distinct improvement over these prior efforts in that a more durable linkage is obtained and is operative in each of opposite directions of drum rotation to provide equalized input effort on each of the shoes so that the wear rates are substantially identical.

Other objects and features of the invention will become apparent from the following detailed description wherein an example embodiment of the invention is selected to illustrate the invention. The description proceeds with reference to the accompanying drawings, wherein.

Figure 1:
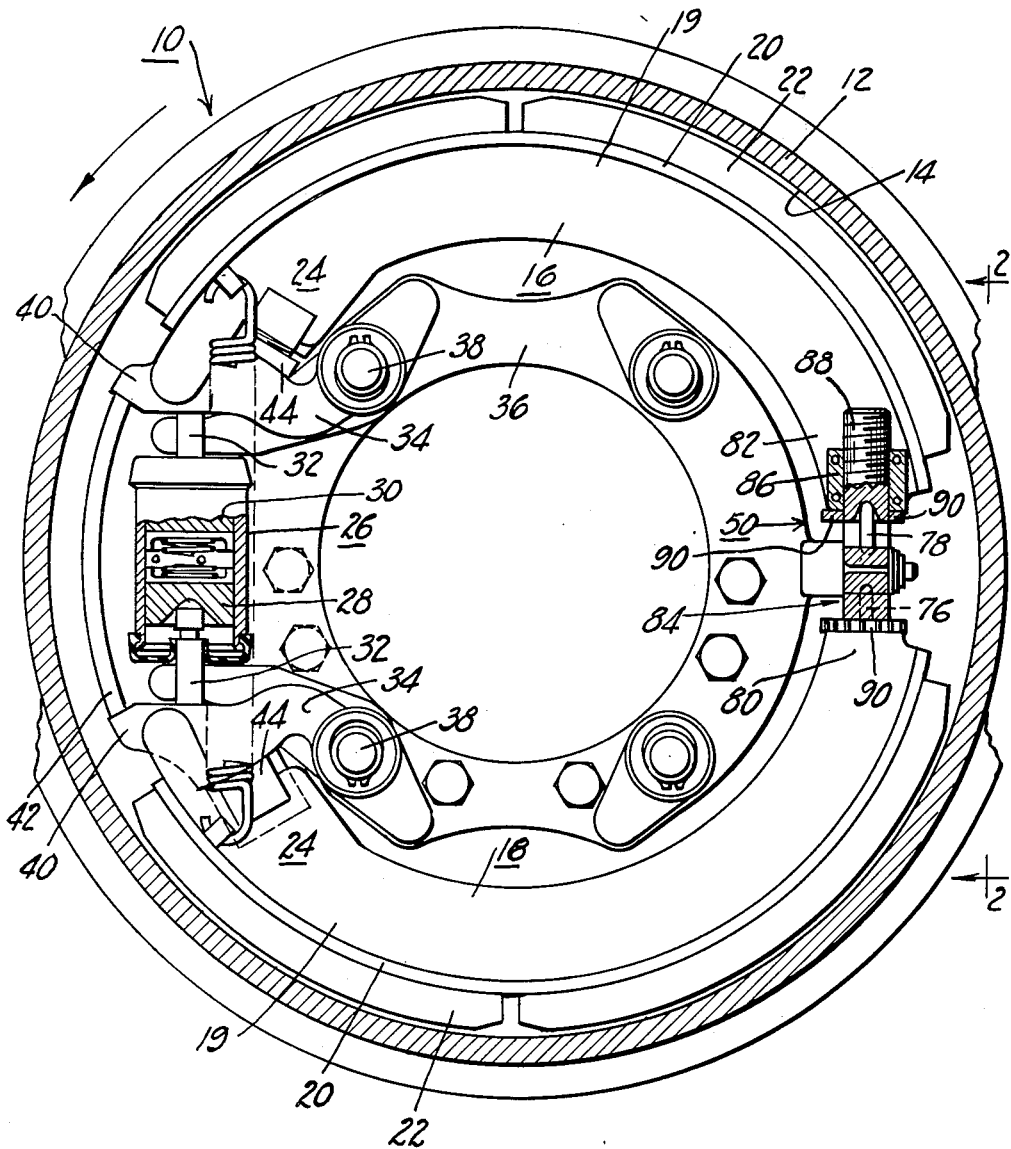
FIGURE 1 is a side elevation view of a hydraulically actuated brake having the present invention incorporated therein.
Figure 2:
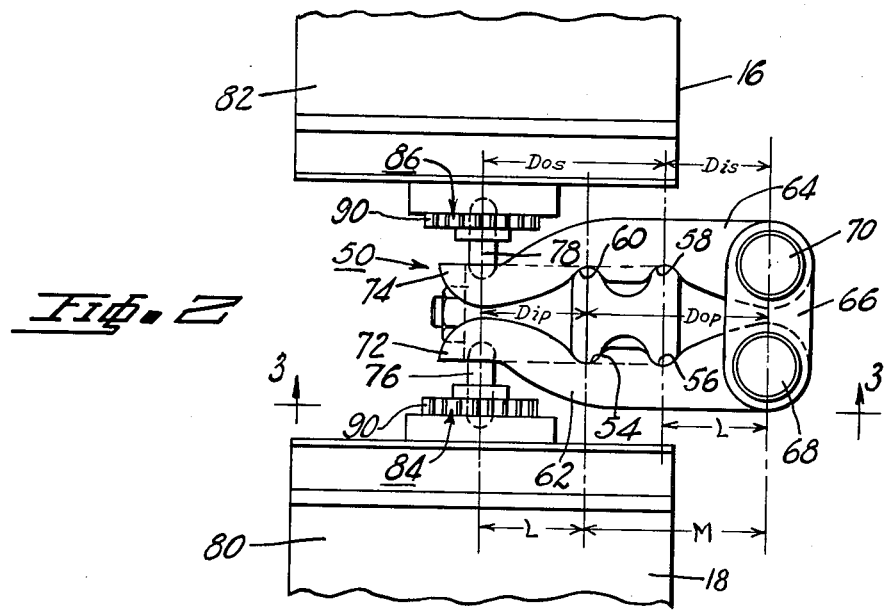
FIGURE 2 is an enlarged detail view of the linkage which interconnects the adjacent shoe ends oppositely from the fluid motor actuator, the view being taken in the direction shown by the arrows 2—2 in FIGURE 1.

The brake designated generally by reference numeral 10 in FIGURE 1 includes the usual rotatable drum 12 having a cylindrical braking surface 14 and two arcuate brake shoes 16 and 18, each having a web 19 and an arcuate rim 20 with spaced segments of friction material lining 22 which engage the opposing cylindrical drum surface 14. The brake shoes 16, 18 have disposed between their adjacent ends 24, a fluid motor actuator 26 having two pistons 28 and 30 which are connected through links 32 with levers 34. Each lever is pivoted on torque plate 36 by a pin 38 and its free end 40 engages anchor 42. Each shoe end 24 is free to pivot and slide on an adjustor screw 44 which provides an abutment surface between the lever 34 and its adjacent shoe end 24.

Figure 3:
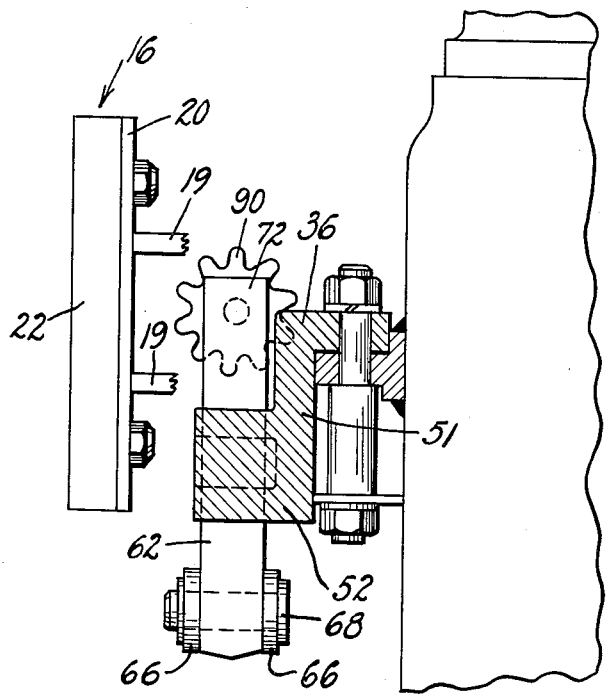
FIGURE 3 is a section view taken on line 3—3 of FIGURE 2.

At the side of the brake oppositely from the fluid motor actuator 26 is a combination anchorage and actuator linkage 50. A portion 51 of the torque plate 36 (FIGURE 3) is laterally offset to provide an abutment 52 having four engagement surfaces 54, 56, 58, and 60 which provide fulcrums for applying levers 62 and 64, respectively. The two levers 62, 64 are fastened together at one pair of their adjacent ends by a link 66 having articulated connections 68 and 70 with levers 62 and 64. The free ends 72 and 74 of the linkage are fastened through struts 76 and 78 to the shoe ends 80, 82, respectively. Between each shoe end and strut is a manually operated adjustor 84 comprising a nut 86 which is fastened to the shoe end and a screw 88 turnable by star wheel 90 to effect an adjustment.

During brake application, one pair of diametrically opposite ends of the shoes 16, 18 are the applied ends and the remaining opposite ends are the anchorage ends of the shoes. Which of the two ends of the shoe are applied is determined by the direction of rotation of the drum 10 and it is so provided that each brake shoe 16, 18 effects "leading shoe" braking action in each direction of drum rotation. This will become clear from a detailed consideration of operation of the brake.

Assuming that the drum is rotating counterclockwise as indicated by the arrow in FIGURE 1, this corresponding to forward vehicle movement, the fluid motor actuator 26 is energized from an appropriate fluid pressure source (as for example, a master cylinder), causing piston 28 and its link 32 to move downwardly and thereby turn lever 34 which applies segments 22 of shoe 18 against the opposed cylindrical surface 14 of the drum 12. The end 80 of shoe 18 anchors through adjustor 84 and strut 76 on the linkage 50 causing lever 62 to fulcrum on 54 where a major portion of the anchoring force of shoe 18 is resisted. The remaining anchoring force is transmitted from the lever 62 through link 66 to lever 64 causing the latter to pivot on fulcrum 58 and push end 74 of lever 64 through strut 78 and adjustor 86 against the end 82 of shoe 16. The shoe 16 is thereby forced outwardly to engage friction segments 22 with the opposed cylindrical surface 14 of the drum and the shoe 16 takes anchorage at its end 24 on the lever 34 which is supported at its opposite ends by pivot pin 38 and anchor 42. The anchoring force of shoe 16 is considerably greater than the hydraulic applying force of piston 30 so that end 24 is the anchorage end of the shoe and end 82 the applied end of the shoe. It will be seen, therefore, that both shoes 16 and 18 are leading shoe brakes, that is, the input applying force is in the direction of the tangential wiping force between the drum and friction surface of the shoe so that the two complement each other in their respective applying efforts.

If the two shoes 16 and 18 were applied by separate fluid motor actuators 26, one at each shoe end, the total fluid displacement for the brake would be in direct proportion to the combined movements of the shoes. But in the present invention since the movement of lever end 72 is multiplied greatly through the linkage to obtain a much larger movement at end 74 of lever 64 to meet requirements of shoe 16, then a saving of total fluid displacement results for the fluid motor 26 as compared with the two fluid motor usage.

In the opposite direction of the drum rotation (clockwise rotation of the drum—FIGURE 1) corresponding to reverse vehicle movement, the end 24 of shoe 16 becomes the leading end and its end 82 the anchorage end; and the end 80 of shoe 18 becomes the applied end with shoe end 24 its anchorage end. When the fluid motor actuator 26 is energized the piston 30 acting through thrust link 32 and lever 34 pivots shoe 16 on its end 82 outwardly, thereby engaging segments 22 with the opposed cylindrical surface 14 of the drum 10. The anchorage force of shoe 16 is transmitted to lever 64 causing it to pivot on its fulcrum 60 which receives the major portion of the anchoring thrust. A portion of the anchoring load, however, is transmitted to lever 62 through link 66 causing it to pivot on its fulcrum 56 so that end 72 bears against strut 76 and applies shoe 18 through its end 80. The shoe 18 anchors on lever 34 which is supported at its opposite end on pivot pin 38 and end 40 bearing against anchor 42.

With counterclockwise rotation of the drum therefor both the shoes 16 and 18 are "leading" shoes so that the braking action is identical in both forward and reverse vehicle movement. It should be further noted that while opposite ends of the shoes are applied in each direction of rotation to effect two leading shoe braking, there is only a single fluid motor actuator 26 required.

An important feature of the present invention is that in each direction of rotation, the shoe end which is applied, either directly by the fluid motor actuator 26 or through the linkage 50, is actuated by equal applying forces so that each shoe 16 and 18 performs an equal amount of the braking work and therefore, each wears at substantially the same rate. Likewise, the applying forces on the drum are equalized around the circumference of the drum, thereby avoiding unbalanced forces on the mounting bearing for the drum. Another important advantage is that equal applying forces on the shoes prevents distortion of the drum and also enhances the controllability and stability of the braking action.

Equalization of applying effort on the brake shoes is accomplished by properly proportioning the linkage 50, and specifically the distances $D_{ip}$, $D_{os}$ and $D_{is}$ which represent respectively the perpendicular distance from the struts 76, 78 to fulcrums 56, 58; and the perpendicular distance from fulcrums 54, 60 to linkage 66. It is further provided that $D_{ip} = D_{is}$ so that the distance $D_{os}$ also equals $D_{op}$ which is the perpendicular distance from fulcrums 54, 60 to strut 66. To facilitate mathematical expression the distance $D_{ip}$, $D_{is}$ are replaced by the symbol "L" and the distances $D_{os}$ and $D_{op}$ by the symbol "M."

In arcuate shoe brakes of the type described and shown in FIGURE 1, the anchoring force of shoe 18 at end 80 is represented by the symbol $A_p$ and the input applying force on the shoe 18 at end 24 is represented by the symbol "P"; the ratio of these two forces $$\frac{A_p}{P} = R$$

the value of R being a value which is determined by the coefficient of friction of the lining, and the brake configuration, and is generally in the order of 3 units or thereabout.

Taking moments now about the fulcrum 54, we have

I. $\qquad A_p L = QM$ where:

$A_p$ = anchoring load of the primary shoe;
$L$ = the lever arm of the anchoring force about the fulcrum 54;
$Q$ = force developed through the link 66; and
$M$ = the perpendicular distance from the link 66 to the fulcrum 54 which is the lever arm of Q.

Taking moments now about the fulcrum 58, we have

II. $\qquad QL = A_s M$ where:

$A_s$ = the applying force developed on the end 82 of shoe 16;
$L$ = the lever arm of the force Q acting through the perpendicular distance from link 66 to fulcrum 58;
$M$ = the perpendicular distance from fulcrum 58 to the strut 78;
$Q$ = same force as described under Equation I.

Solving for Q in Equations I and II and equating them to each other, we have

III. $\qquad \dfrac{A_p L}{M} = \dfrac{A_s M}{L}$ and since as previously stated, IV. $\qquad \dfrac{A_p}{P} = R$ where:

$P$ = the input force on the brake shoe 18;
$A_p$ = anchoring force on the brake shoe 18; and
$R$ = the characteristic value previously described.

Substituting Equation IV into Equation III we have

V. $\qquad \dfrac{PRL}{M} = \dfrac{A_s M}{L}$

Since the input force P on the brake shoe 18 is to be made the same as the applying force $A_s$ on the shoe 16, then both A and $A_s$ may be cancelled from Equation V; and, solving for the ratio of M and L, we have VI. $\qquad \sqrt{R} = \dfrac{M}{L}$ Knowing therefore the characteristics of the friction material and the general brake configuration which would determine the value of R, it is possible to provide a family of lengths of "M" and "L" which will function to provide equal applying force on the brake shoes 16 and 18 in both forward and reverse vehicle operation.

During braking with clockwise rotation of the drum, the anchoring force of brake shoe 16 is resisted in major part by engagement of lever 64 with its fulcrum 60 but applying effort is communicated through linkage 50 as applying effort on end 80 of brake shoe 18 through the free end 72 of the lever which pivots on its fulcrum 56. The applying effort on shoe end 80 is the same as the input effort at end 24 of shoe 16, so that equal braking work is done by both of the shoes in reverse as well as in forward vehicle movement.

By making an articulated linkage of the two levers 62 and 64, it is possible to obtain a substantial amount of brake shoe applying movement from the end of the one lever in a comparatively short length of linkage. In other words, if an equivalent amount of shoe applying movement were obtained by means of a single lever, then it would have to be about twice as long as the individual levers 62 and 64. Consequently, the necessary amount of shoe applying movement can be obtained by a relatively reduced length of lever means by usage of an articulated linkage.

Although the present invention has been described in connection with but a single selected example embodiment, it will be understood that this is only illustrative of the invention and is in no way restrictive thereof. It may be reasonably assumed that those skilled in the art can make various modifications and revisions to meet individual design preference, and it is intended therefore that such revisions and variations as incorporate the herein disclosed principles will be included within the scope of the following claims as equivalents of the invention.

What is claimed is:

1. A brake comprising two arcuate friction material lined brake shoes, a rotatable drum having a cylindrical braking surface engageable by the friction material lined shoes which effect braking action thereon, actuating means at one pair of adjacent ends to force each of the shoe ends apart for brake operation, nonrotatable anchorage means disposed at said one pair of shoe ends to receive the anchoring torque of each shoe, combined anchorage and applying means disposed between the other pair of shoe ends oppositely from said actuating means and including a fixed member providing four fulcrums, two levers located one on each side of said fixed member and each having portions in pivotal engagement with two of said four fulcrums and each movable about one or the other of its two fulcrums depending upon the direction of input force, means forming an articulated connection between one pair of adjacent ends of said levers to transmit actuating effort therebetween, and means connecting each of the other pair of adjacent ends of said levers to a respective one of said shoes and thereby communicating between said shoes a part of the anchoring load of one shoe as applying effort on the other shoe, the effective lever arms of said links on their respective fulcrums being proportioned so that the longer effective lever arm of one lever bears a relation to the shorter effective lever arm of the other lever so that the quotient thereof equals substantially the square root of R; where, $$R \text{ equals } \frac{A_p}{P}$$

the $A_p$ equals the anchoring load of one shoe and P equals the input force at its applied end effected by said actuating means.

2. A brake comprising a pair of brake shoes having fixed anchorage means at one pair of adjacent ends, actuating means disposed between said one pair of adjacent ends for effecting radial applying movement of at least one of said shoe ends, combined anchorage and applying means disposed between the other pair of adjacent ends of said shoes oppositely from said fixed anchorage means and including a fixed member providing spaced fulcrums thereon, two levers located one on each side of said fixed member and each fulcruming on either of two fulcrums provided by said fixed member for said respective levers depending upon the direction of shoe movement, means connecting said levers to provide a linkage between said levers and concurrent operation of said levers, means transmitting the anchoring load of either shoe to its lever of said linkage and effecting turning of the other lever combined with the other brake shoe with a force substantially the same as the input force on said either shoe, and means for communicating the turning movement of said other lever to its associated brake shoe as applying effort thereon, the lever ratio of each said lever on its respective fulcrums being proportioned such that the applying force on each shoe end is substantially equal and dimensioned so that its effective leverage ratio in operation is substantially equal to the square root of the ratio of shoe anchoring force and applying force of the shoe applied directly by said actuating means.

3. A brake comprising two arcuate friction material lined brake shoes, a rotatable drum having a cylindrical braking surface engageable by the friction material lined shoes which provide braking action thereon, actuating means at one pair of adjacent ends to force the leading end of the one shoe outwardly for brake operation, nonrotatable anchorage means disposed at the ends of said shoes responsive to said actuating means to receive the anchoring torque of the trailing end of said one shoe, combined anchorage and applying means disposed between the shoe ends oppositely from said actuating means and including a fixed member providing four fulcrum centers, two levers each having portions in pivotal engagement with two of said four fulcrums and movable about one or the other of its two fulcrums depending upon the direction of input force, means forming an articulated connection between one pair of adjacent ends of said levers, and means connecting each of the ends of said levers oppositely from their articulated ends to a respective one of said shoes and thereby communicating between said shoes a part of the anchoring load of one shoe as applying effort on the leading end of the other shoe, the effective lever arms of said levers on their respective pivots being proportioned so that the longer effective arm of one lever bears a relation to the shorter effective arm of the other lever in that the quotient thereof equals substantially the square root of R; where, $$R \text{ equals } \frac{A_p}{P}$$

and $A_p$ equals the anchoring load of the shoe energized by said actuating means, and P equals the input force at its applied end, and a torque plate for mounting said anchorage means.

4. A brake comprising a pair of brake shoes having fixed anchorage means at one pair of adjacent ends and actuating means disposed between said one pair of adjacent ends for effecting radial applying movement of the leading one of said shoe ends, combined anchorage and applying means disposed between the other pair of adjacent ends of said shoes oppositely from said fixed anchorage means and including a fixed member providing four spaced fulcrums thereon at four points defining a rectangular outline, two levers located one on each side of said fixed member and each fulcruming on either of its two fulcrums depending upon the direction of braking movement, means connecting said levers to provide a U-shaped linkage of said levers and concurrent operation of said levers, means transmitting the anchoring load of the shoe energized by said actuating means to the one lever of said linkage and effecting turning of the lever combined with the other brake shoe at a force substantially the same as the input force on said one shoe, and means for communicating the turning movement of the lever combined with said other brake shoe as applying effort at its leading end, the lever ratio of said lever arms on the respective fulcrums, being proportioned such that in either direction of actuation of said linkage the applying force on each shoe end is substantially equal, each said lever being of a dimension that the effective leverage ratio in operation is substantially equal to the square root of the ratio of shoe anchoring force and applying force effected by said actuating means.

5. A brake comprising two arcuate brake shoes having opposite ends adapted to be applied for providing leading shoe braking in each direction of drum rotation, actuator means having two oppositely applied pressure responsive members disposed between one pair of adjacent shoe ends, anchorage means also disposed between said one pair of adjacent shoe ends, abutment means disposed between the other pair of adjacent shoe ends and providing four fulcrums thereon spaced apart from each other in the general relationship of four corners of a quadrilateral, two levers one at each side of said abutment and each having portions adapted to fulcrum on one or the other of diagonally disposed fulcrums on said abutment, means pivotally connecting the ends of said levers at one side of said fulcrum to provide a force transmission linkage of said levers, means interconnecting the opposite free ends of said levers one to each of said shoes whereby anchoring force of one of said shoes on its lever is transmitted through said linkage as applying effort on the leading end of the other of said shoes, the effective lever arm of said linkage receiving the anchoring load of one shoe being dimensioned in relation to the effective lever arm of said linkage applying the other of said shoes to provide substantially equal applying effort at the input or leading end of each said shoes.

6. The brake structure in accordance with claim 5 wherein the effective lever arm of said linkage developing applying effort is in proportion to the effective lever arm of the anchoring force on said linkage as the square root of the ratio of anchorage force of the shoe actuated by said applying means to the applying effort thereon developed by said actuating means.

7. A brake comprising a rotatable drum having a cylindrical braking surface, two brake shoes, each applied from its leading end thereof in one or the other of the directions of drum rotation, actuating means at one pair of adjacent ends of said shoes and including a hydraulic cylinder and two oppositely applied pistons with operative connections between the respective pistons and brake shoe ends, anchorage means at said one pair of adjacent shoe ends, means forming a fixed abutment between the other pair of adjacent shoe ends and providing four spaced fulcrums thereon and disposed at right angles to each other, an articulated U-shaped linkage extending around three of the sides of said abutment and having portions in contact with each of the four fulcrum points thereon, means connecting the free ends of said linkage with said other adjacent shoe ends to receive the anchoring load of one or the other of its connected shoe ends depending upon the direction of drum rotation and to transmit thereby applying effort between said shoe ends connected by said linkage, the effective lever arm of said linkage receiving anchoring load being proportioned relatively to the effective lever arm of said linkage developing applying thrust on its adjacent shoe end whereby substantially equal input applying effort is developed at each of the opposite applied shoe ends.

References Cited in the file of this patent

UNITED STATES PATENTS

| | | |
|---|---|---|
| 2,246,242 | Chase | June 17, 1941 |
| 2,312,363 | Sawtelle | Mar. 2, 1943 |
| 2,777,542 | Russell | Jan. 15, 1957 |

FOREIGN PATENTS

| | | |
|---|---|---|
| 1,109,421 | France | Sept. 28, 1955 |
| 285,037 | Germany | June 17, 1915 |
| 257,459 | Great Britain | Sept. 2, 1926 |